UNITED STATES PATENT OFFICE.

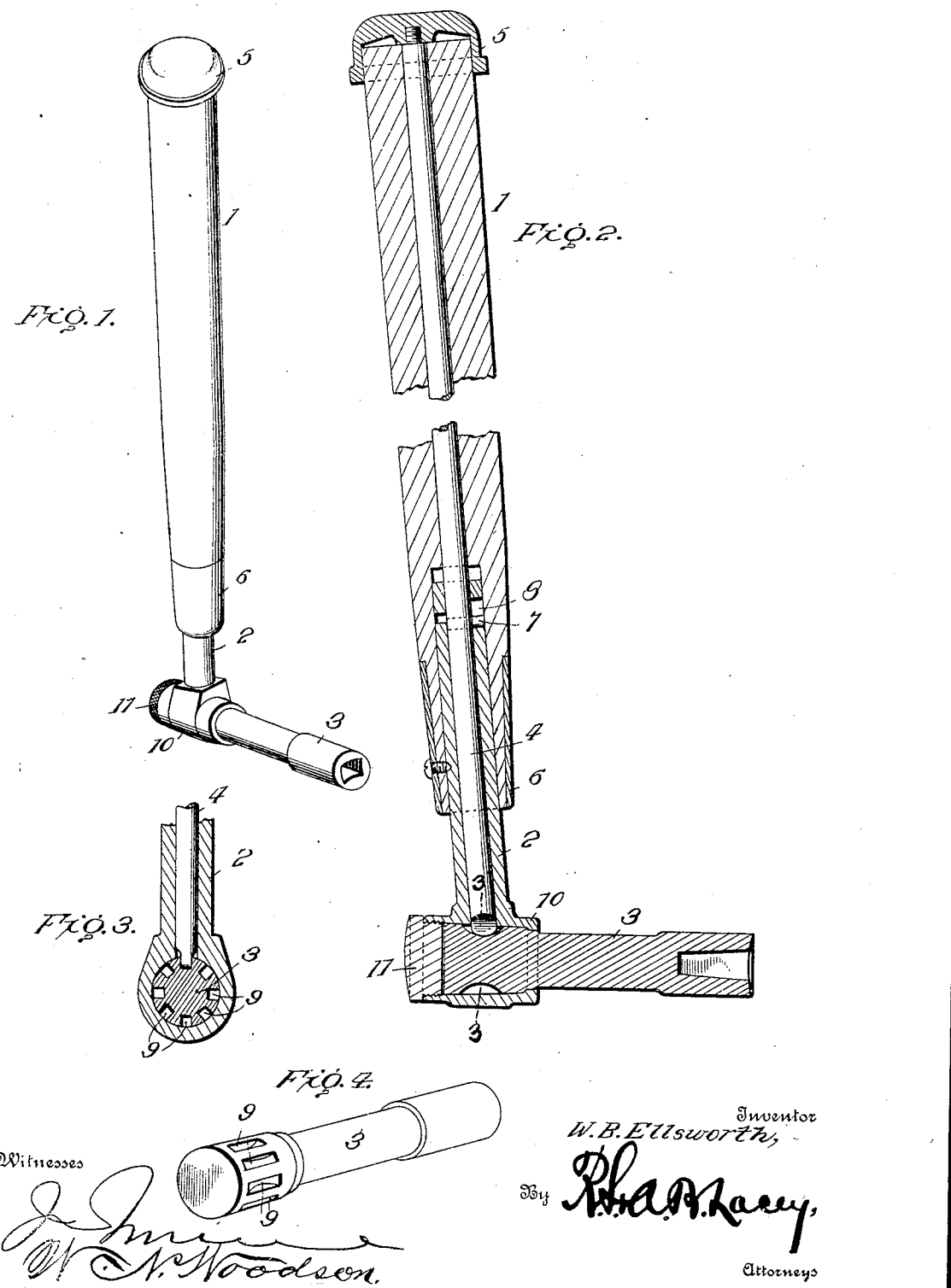

WILLIAM B. ELLSWORTH, OF HUDSON, OHIO.

TUNING-HAMMER.

No. 842,307.  Specification of Letters Patent.  Patented Jan. 29, 1907.

Application filed September 11, 1906. Serial No. 334,169.

*To all whom it may concern:*

Be it known that I, WILLIAM B. ELLSWORTH, a citizen of the United States, residing at Hudson, in the county of Summit and State of Ohio, have invented certain new and useful Improvements in Tuning-Hammers, of which the following is a specification.

This invention relates to that class of tools designed particularly for use in the construction or repair of pianos and commonly called "tuning-hammers."

The aim of the invention is to provide a tuning-hammer which is of an extremely simple construction, permitting of ready taking apart, and admitting of extreme ease in operation thereof.

The invention resides also in new and novel details of structure, the form and advantages for which will appear fully as the description proceeds.

For a full understanding of the invention and the merits thereof and also to acquire a knowledge of the details of construction of the means for effecting the result reference is to be had to the following description and accompanying drawings, in which—

Figure 1 is a perspective view of a tuning-hammer embodying the invention. Fig. 2 is a vertical longitudinal sectional view of the hammer. Fig. 3 is a sectional view on the line 3 3 of Fig. 2. Fig. 4 is a detail perspective view of the turning head.

Corresponding and like parts are referred to in the following description and indicated in all the views of the drawings by the same reference characters.

Specifically describing the invention, the hammer comprising the same consists mainly of a handle 1, from one end portion of which extends a shank or tang 2, a turning head 3 being mounted for rotation on the shank 2.

The handle 1 may be said to be hollow, a longitudinally-slidable dog 4 being mounted therein and having an extremity thereof projecting from the handle at the upper end of the latter, as shown in Fig. 2. The upper extremity of the dog has a finger-piece 5 secured thereto, preferably by a threaded connection, and the finger-piece 5 is movable to actuate the dog 4 and cause the latter to be engaged with and disengaged from the turning head 3. The finger-piece 5 is preferably in the form of a cap, which receives the upper end of the handle and which is arranged in such a way as to conduce to the attractiveness of the tool, at the same time being convenient for actuation by the operator who uses the same. The lower end portion of the dog 4 is mounted in the shank 2, the latter being tubular in order to receive said dog 4. The upper portion of the shank 2 is received in the lower portion of the handle 1, a suitable ferrule 6 being located at the lower portion of said handle and being secured thereto by a screw, which securely fastens the handle to the shank 2 in such a way as to prevent detachment of the parts.

The dog 4 has a sliding connection with the shank 2 of the tool, said connection being established by a pin 7, which projects from the dog and enters a short slot 8 in the upper portion of the shank 2. The pin-and-slot connection established between the dog 4 and the shank 2 will permit of a slight longitudinal movement of the dog 4 sufficient to cause the lower engaging end of the dog to be engaged with or disengaged from annularly-arranged notches 9, which are formed near one end of the turning-head 3. The turning head 3 is mounted in a horizontal socket member 10, which is integrally formed at the lower end of the shank 2 of the tool. The socket of the socket member 10 is of tapering form, and an end portion of the turning head 3, designed to fit normally in the socket of the member 2, is similarly tapered, as shown most clearly in Fig. 2 of the drawings. The turning head 3 at its outer end is provided with the usual socket to receive the head of a tuning-pin of the type usually employed in piano construction, and that end which is provided with the above-mentioned socket is of a size adapted to readily pass through the socket of the member 10. To prevent displacement of the turning-head 3 from the socket member 10, the larger end of the socket or opening in the member 10 is internally threaded, so as to receive a threaded cap or screw 11. When the latter is in position upon the member 10, the larger end of the socket of said member is closed and the larger end of the turning head 3 is in rotative contact with the screw or cap 11. The latter, however, prevents lateral displacement from the socket member 10, said head 3 being held in such a position that the notches 9 thereof may be readily engaged on proper manipulation of the dog 4.

The operation of the tool will be evident to those versed in the art to which the invention appertains, it being seen that in working the handle 1 back and forth after the head 3 has been engaged with the tuning-pin the cap of finger-piece 5 may be so manipulated as to cause the dog 4 to intermittently engage the turning head 3 to cause rotation of the latter in the desired direction.

It will be observed that the notches 9 in the head 3 do not extend clear across the head, but provide a bearing at opposite ends, giving extra strength and preventing likelihood of the head cutting out the socket.

Having thus described the invention, what is claimed as new is—

1. In a tuning-hammer, the combination of a handle embodying a suitable shank provided with a socket member, said socket member being formed with a socket or opening tapering toward an end thereof, a turning head mounted in the socket of the socket member, a cap for closing the larger end of the tapering socket to prevent displacement of the turning head from the shank, and a dog carried by the handle to engage the turning head for rotating the latter.

2. In a tuning-hammer, the combination of a handle embodying a shank provided at one end with a socket member having a tapering socket, a turning head mounted in said socket member and having a tapering portion snugly fitting in the socket thereof, a cap or closure for the larger end of the socket of the socket member to prevent displacement of the turning head therefrom, and a dog mounted on the handle and arranged to engage the turning head for rotation of the latter.

3. In a tuning-hammer, the combination of a handle embodying a shank of tubular formation, said shank having a socket member at its lower end provided with a tapering socket or opening, a turning head having an end portion thereof tapering so as to snugly fit in the socket of the socket member the larger end of the socket aforesaid being threaded, a screw or cap screwed into the threaded portion of the socket to prevent displacement of the turning head therefrom, a sliding dog mounted in the tubular portion of the shank of the handle to engage the turning head for rotation of the latter, and means for actuating said dog.

4. In a tuning-hammer, the combination of a handle, a shank of tubular form having an end portion thereof received in the handle, a turning head mounted in the outer end of the shank, a sliding dog mounted on the handle and having an end portion thereof movable through the shank to engage with the turning head, a pin-and-slot connection between the dog and the shank of the handle, and means for actuating the dog in the manner specified.

In testimony whereof I affix my signature in presence of two witnesses.

WILLIAM B. ELLSWORTH. [L. S.]

Witnesses:
L. R. ADAMS,
F. M. SPRAGUE.